US009725157B2

(12) United States Patent
Albert et al.

(10) Patent No.: US 9,725,157 B2
(45) Date of Patent: Aug. 8, 2017

(54) METHOD AND DEVICE FOR AUTOMATICALLY COMPARING FLIGHT TRAJECTORIES OF AIRCRAFT

(71) Applicant: AIRBUS OPERATIONS (SAS), Toulouse (FR)

(72) Inventors: Nicolas Albert, La Salvetat Saint Gilles (FR); Boris Kozlow, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 21 days.

(21) Appl. No.: 14/697,896

(22) Filed: Apr. 28, 2015

(65) Prior Publication Data

US 2015/0314854 A1 Nov. 5, 2015

(30) Foreign Application Priority Data

Apr. 30, 2014 (FR) .................................... 14 53940

(51) Int. Cl.
*G08G 5/00* (2006.01)
*B64C 13/04* (2006.01)

(52) U.S. Cl.
CPC ........... *B64C 13/04* (2013.01); *G08G 5/0039* (2013.01)

(58) Field of Classification Search
CPC .... B64C 13/04; G08G 5/0039; G08G 5/0017; G08G 5/003; G08G 5/0047; G08G 5/0095
See application file for complete search history.

(56) References Cited

U.S. PATENT DOCUMENTS

| | | | | |
|---|---|---|---|---|
| 4,350,983 A * | 9/1982 | Blaha | F41G 7/343 | 244/3.19 |
| 5,714,948 A * | 2/1998 | Farmakis | B60R 25/1025 | 340/961 |
| 6,269,301 B1 * | 7/2001 | Deker | G05D 1/0202 | 701/410 |
| 6,922,631 B1 * | 7/2005 | Dwyer | G01C 23/00 | 340/971 |
| 2005/0261808 A1 * | 11/2005 | Artini | G01C 23/00 | 701/3 |
| 2006/0085101 A1 * | 4/2006 | Berard | G01C 23/00 | 701/3 |

FOREIGN PATENT DOCUMENTS

| | | |
|---|---|---|
| EP | 1 598 641 | 11/2005 |
| EP | 1 600 733 | 11/2005 |
| EP | 2 685 440 | 1/2014 |
| FR | 2 941 794 | 8/2010 |

OTHER PUBLICATIONS

FR Search Report for 1453940 dated Jan. 9, 2015, two pages.

* cited by examiner

*Primary Examiner* — Genna Mott
(74) *Attorney, Agent, or Firm* — Nixon & Vanderhye P.C.

(57) ABSTRACT

A method and device for automatically comparing two flight trajectories for an aircraft includes a central processing unit having a first comparison element for automatically comparing lateral trajectories of the two flight trajectories, and a second comparison element for automatically comparing vertical trajectories of these two flight trajectories, these comparisons being carried out successively leg by leg of the flights, these comparisons being carried out as long as the respective successive legs are identical and at least for a predefined distance in the horizontal plane.

16 Claims, 6 Drawing Sheets

METHOD AND DEVICE FOR AUTOMATICALLY COMPARING FLIGHT TRAJECTORIES OF AIRCRAFT

RELATED APPLICATION

This application claims priority to French application 14-53940 filed Apr. 30, 2014, the entirety of which is incorporated by reference.

BACKGROUND OF INVENTION

The present invention concerns a method and a device for automatic comparison of flight trajectories of aircraft.

DESCRIPTION OF THE PRIOR ART

During the flight of an aircraft, especially during low-altitude flight in automatic mode (using an automatic pilot and/or a flight director), it is known how to make onboard systems modify the trajectory of the aircraft (laterally and vertically) on demand of the pilot of the aircraft.

To do this, the pilot modifies the flight plan by using a flight control system of the aircraft. The flight control system calculates a new trajectory (lateral and/or vertical) corresponding to the modified flight plan. The calculation of this new trajectory may take several seconds. During this time, the aircraft should continue flying on the present trajectory before the change can actually take place. Thus, in order to safeguard the transition between the current trajectory and the new trajectory, these trajectories should have a portion in common.

Consequently, before allowing the guidance onto the new trajectory, a guidance system of the aircraft should compare the two trajectories in order to verify that these two trajectories indeed have a portion in common corresponding at least to the flight time of the aircraft during the process of calculating the trajectory. If the two trajectories do not have a portion in common or if the common portion is too short, the new trajectory cannot be activated and the aircraft will continue to be guided along the current trajectory. If the two trajectories have a portion in common of sufficient length, the new trajectory can be activated and the aircraft will then be guided along the new trajectory. Even so, in order to verify the existence of a portion in common, it is necessary to have a means of comparing the two trajectories. It would be desired that the means of comparing trajectories did not take too long. Comparing trajectories point by point may be too time consuming.

SUMMARY OF THE INVENTION

A system and method have been conceived and are disclosed herein to rapidly and reliably compare flight trajectories of an aircraft and execute a change of a flight trajectory, if the comparison verifies that the flight trajectories are the same for a certain distance. The system and method involve automatic comparisons of first and second flight trajectories.

The first flight trajectory may comprise a first vertical trajectory and a first lateral trajectory, and the second flight trajectory may comprise a second vertical trajectory and a second lateral trajectory. The first lateral trajectory and the second lateral trajectory may each comprise a succession of lateral segments. The first vertical trajectory and the second vertical trajectory may each comprise a succession of vertical segments.

A method has been conceived and is disclosed herein that receives the first flight trajectory and the second flight trajectory, and automatically carries out at least one of the following comparison steps:

(a) compare the first lateral trajectory and the second lateral trajectory of the first and second flight trajectories, wherein the comparison is done in successive manner, flight segment by segment, and the comparison is carried out for as long as the respective successive segments are identical and at least for a predetermined distance in the horizontal plane; and (b) compare, flight segment by segment, the first vertical trajectory and the second vertical trajectory of the first and second flight trajectories, wherein the comparison is carried out in successive manner, segment by segment, for as long as the respective successive segments are identical and for at least for a predetermined distance in the horizontal plane.

The method includes transmitting automatically the results of the comparison step to an aircraft guidance device or to a user device, such as a display presenting graphical information to the pilot or other flight officers in the cockpit of the aircraft.

The comparison of trajectories are performed on successive segments of the trajectories. Comparing segments is a reduced computational burden as comparing individual points in the trajectories. Thus, the comparison of segments is relatively quick and provides results faster than a conventional point-by-point comparison.

In the context of an embodiment of the present invention: each of the lateral segments of a lateral trajectory corresponds to one of the following segments: a lateral segment of rectilinear type or a lateral segment of curved (or curvilinear) type and it comprises in particular a departure point and an arrival point; and each of the vertical segments of a vertical trajectory corresponds to one of the following segments: a vertical segment of rectilinear type or a vertical segment of curved (or curvilinear) type and it comprises in particular a departure point and an arrival point.

A comparison between a lateral segment of the first flight trajectory, so-called first lateral segment, and a lateral segment of the second flight trajectory, so-called second lateral segment, may include the following successive steps (E1 to E5D):

(E1) verifying if the departure points of the first and second lateral segments are identical, and: if they are not identical, drawing the conclusion that the first and second lateral segments are different; and otherwise, carrying out a step E2);

E2) verifying if the types of the first and second lateral segments are identical, and, if they are not identical, drawing the conclusion that the first and second lateral segments are different; and otherwise, carrying out a step E3);

E3) verifying if the two lateral segments of identical types are of rectilinear type or curved type, and if the two lateral segments are of rectilinear type carrying out a step E4), and if the two lateral segments are of curved type carrying out a step E5);

E4) verifying if the arrival points of the first and second lateral segments are identical, and, if they are identical, drawing the conclusion that the first and second lateral segments are identical; and otherwise, carrying out a step E4A);

E4A) verifying if the orientations (specified below) of the first and second lateral segments are identical, and, if they are not identical, drawing the conclusion that the first and second lateral segments are different; and otherwise, carrying out a step E4B);

E4B) verifying which of the two segments is the shortest and considering the shortest segment as corresponding to the start of the other segment;

E5) verifying if the directions of rotation of the first and second lateral segments are identical, and, if they are not identical, drawing the conclusion that the first and second lateral segments are different; and otherwise, carrying out a step E5A);

E5A) verifying if the centers of the first and second lateral segments are identical, and, if they are not identical, drawing the conclusion that the first and second lateral segments are different; and otherwise, carrying out a step E5B);

E5B) verifying if the arrival points of the first and second lateral segments are identical, and, if they are identical, drawing the conclusion that the first and second lateral segments are identical; and otherwise, carrying out a step E5C);

E5C) verifying if the turn radii of the first and second lateral segments are identical, and, if they are not identical, drawing the conclusion that the first and second lateral segments are different; and otherwise, carrying out a step E5D); and E5D) verifying which of the two segments is the shortest and using the shortest segment as corresponding to the start of the other segment.

Moreover, the comparison between a vertical segment of the first flight trajectory, so-called first vertical segment, and a vertical segment of the second flight trajectory, so-called second vertical segment, may including the following successive steps (F0 to F5D):

F0) verifying if the first and second vertical segments refer to the same lateral segment, and, if they do not refer to the same lateral segment, drawing the conclusion that the first and second vertical segments are different; and otherwise, carrying out a step F1);

F1) verifying if the departure points of the first and second vertical segments are identical, and, if they are not identical, drawing the conclusion that the first and second vertical segments are different; and otherwise, carrying out a step F2);

F2) verifying if the types of the first and second vertical segments are identical, and, if they are not identical, drawing the conclusion that the first and second vertical segments are different; and otherwise, carrying out a step F3);

F3) verifying if the two vertical segments of identical type are of rectilinear type or curved type, and if the two vertical segments are of rectilinear type carrying out a step F4), and if the two vertical segments are of curved type carrying out a step F5);

F4) verifying if the arrival points of the first and second vertical segments are identical, and, if they are identical, drawing the conclusion that the first and second vertical segments are identical; and otherwise, carrying out a step F4A);

F4A) verifying if the slopes of the first and second vertical segments are identical, and, if they are not identical, drawing the conclusion that the first and second vertical segments are different; and otherwise, carrying out a step F4B);

F4B) verifying which of the two segments is the shortest and using the shortest segment as corresponding to the start of the other segment;

F5) verifying if the directions of rotation of the first and second vertical segments are identical, and, if they are not identical, drawing the conclusion that the first and second vertical segments are different; and otherwise, carrying out a step F5A);

F5A) verifying if the centers of rotation of the first and second vertical segments are identical, and, if they are not identical, drawing the conclusion that the first and second vertical segments are different; and otherwise, carrying out a step F5B);

F5B) verifying if the arrival points of the first and second vertical segments are identical, and, if they are identical, drawing the conclusion that the first and second vertical segments are identical; and otherwise, carrying out a step F5C);

F5C) verifying if the turn radii of the first and second vertical segments are identical, and if they are not identical, drawing the conclusion that the first and second vertical segments are different; and otherwise, carrying out a step F5D); and F5D) verifying which of the two segments is the shortest and using the shortest segment as corresponding to the start of the other segment.

Furthermore, the method may include successively carrying out the comparison steps, for example starting with the comparison of the lateral trajectories.

Moreover, the method comprises a supplemental step of copying the first flight trajectory to form the second flight trajectory; wherein the first and second flight trajectories are low-altitude flight trajectories.

The present invention likewise concerns a device for automatic comparison of first and second flight trajectories, such as those mentioned above.

A device has been conceived and is disclosed herein comprising:

a receiving unit configured to receive the first flight trajectory and the second flight trajectory;

a central processing unit comprising:

a first comparison element configured to automatically compare the first lateral trajectory and the second lateral trajectory of the first and second flight trajectories, this comparison being done in successive manner, segment by segment, the comparison being done for as long as the respective successive segments are identical and at least on a predetermined distance in the horizontal plane; and a second comparison element configured to automatically compare the first vertical trajectory and the second vertical trajectory of the first and second flight trajectories, this comparison being done in successive manner, segment by segment, the comparison being done successively for as long as the respective successive segments are identical and at least on a predetermined distance in the horizontal plane; and a data transmission unit configured to automatically transmit to user means the result of the calculations performed by the central processing unit.

A guidance system for an aircraft has been conceived and is disclosed herein comprising:

a flight control calculator configured to automatically calculate, during a flight of the aircraft along a flight trajectory known as the current trajectory, a new flight trajectory known as the auxiliary trajectory;

a guidance device, including a display visible to pilots and other flight officers, to guide the aircraft along a flight trajectory;

a comparison device as mentioned above, to make a comparison of trajectories between the current trajectory and the auxiliary trajectory; and a trajectory change unit, configured to automatically make a change in the flight trajectory if the current and auxiliary trajectories have a common leg of length greater than a predetermined threshold, a change in the flight trajectory consisting in the replacing of the current trajectory by the auxiliary trajectory so that the guidance device guides the aircraft along the auxiliary trajectory as of the change being effected. Thus, the guidance device compares the two trajectories to verify that the two trajectories have segments in common that is longer than certain thresholds before allowing the auxiliary trajectory to be activated and allow the aircraft to be guided along the auxiliary trajectory The present invention moreover concerns an aircraft, in particular a transport airplane, which is provided with such a comparison device and/or such a guidance system.

BRIEF DESCRIPTION OF THE DRAWINGS

The enclosed figures will better explain how the invention can be realized. In these figures, identical references designate similar elements.

DESCRIPTION OF EMBODIMENTS OF THE INVENTION

Figure 1:
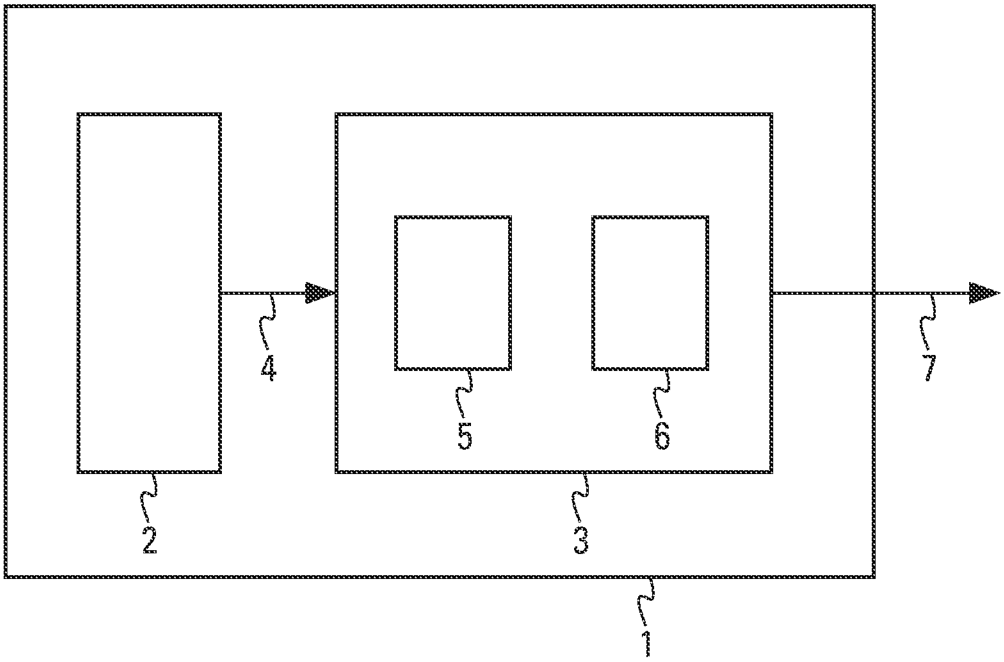
FIG. 1 illustrates schematically one particular embodiment of a device according to the invention.

The device 1 shown schematically in FIG. 1 and illustrating the invention is a comparison device designed to automatically compare a first flight trajectory T1 and a second flight trajectory T2 of an aircraft AC (FIG. 10), in particular, a military transport airplane. This device 1 can be used notably during a low-altitude flight, as explained below with reference to FIGS. 9 and 10.

The flight trajectory T1 comprises a vertical trajectory T1V defined in the vertical plane and a lateral trajectory T1L defined in the lateral (or horizontal) plane, and the flight trajectory T2 comprises a lateral trajectory T2L and a vertical trajectory T2V.

The lateral trajectories T1L and T2L each comprise a succession of a plurality of lateral segments SL, and the vertical trajectories T1V and T2V each comprise a succession of a plurality of vertical segments SV.

The device 1 which is embarked aboard the aircraft AC contains:

a receiver unit 2 configured to receive the flight trajectory T1 and the flight trajectory T2;

a central processing unit 3, such as a processor including non-transitory memory storing instructions to be executed by the processor. The central processing unit is connected by a communications link 4 to the receiving unit 2 comprises logic functional units, such as may be performed by the central processing unit by executing stored instructions, including:

a comparison element 5 for automatically comparing the lateral trajectory T1L and the lateral trajectory T2L, respectively, of the flight trajectories T1 and T2. The comparison element 5 performs this comparison successively, (lateral) segment by (lateral) segment. This comparison is done for as long as the successive respective segments of the lateral trajectories T1L and T2L are identical and at least for a predetermined distance in the horizontal plane; and a comparison element 6 for automatically comparing the vertical trajectory T1V and the vertical trajectory T2V, respectively, of the flight trajectories T1 and T2. The comparison element 6 performs this comparison successively, (vertical) segment by (vertical) segment. This comparison is done successively for as long as the successive respective vertical segments of the vertical trajectories T1V and T2V are identical; and a data transmission unit (illustrated by a link 7) for automatically transmitting the result of the calculations done by the central processing unit 3 to a user means, such as a display device or a guidance computer, as explained below.

The device 1 implements an analytical method to automatically make the comparison of trajectories T1 and T2. The device compares the two trajectories T1 and T2 segment by segment, in the horizontal plane and/or in the vertical plane.

In one application (specified below), the flight trajectories T1 and T2 are low-altitude flight trajectories, used in particular during a revision of a flight plan.

The comparison elements 5 and 6 of the central processing unit 3 thus compare the segments two by two, until achieving a desired length of common trajectory. The similarity between two segments, as explained below, can be either complete wherein all the parameters of a segment are identical to the parameters of the segment being compared against, or partial wherein the two segments are different, but superimposed on a certain length.

Figure 2:
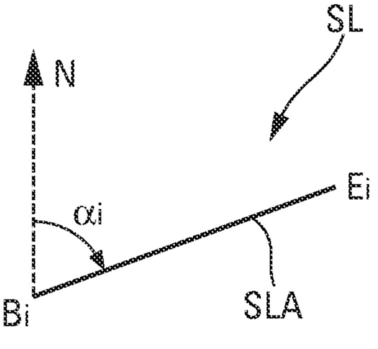
FIGS. 2 and 3 present geometrical parameters for defining a lateral segment of a lateral trajectory.
Figure 3:
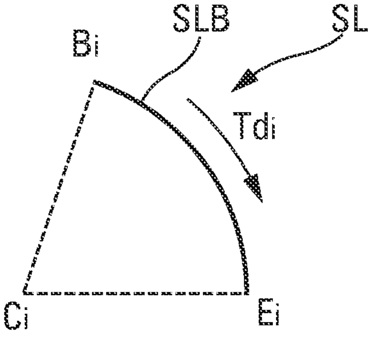

A lateral segment of trajectory SL can be a lateral segment SLA of rectilinear type (namely, a line segment) or a lateral segment SLB of curved or curvilinear type (namely, a circular arc), as shown respectively in FIGS. 2 and 3. This lateral segment SLA, SLB is defined by the following geometric parameters:

a. the latitude/longitude of the departure point Bi of the segment SLA, SLB;

b. the latitude/longitude of the arrival point Ei of the segment SLA, SLB;

c. the type Ti of the segment SLA, SLB: curved or rectilinear;

d. the latitude/longitude of the turn center Ci (for the curved or curvilinear segments); and e. the direction of rotation Tdi (for the curved or curvilinear segments).

One will also consider, for the rectilinear segments, the orientation αi with respect to north N, namely, a heading of the line passing through the departure point Bi (defined by its latitude/longitude) and the arrival point Ei (defined by its latitude/longitude).

Figure 4:
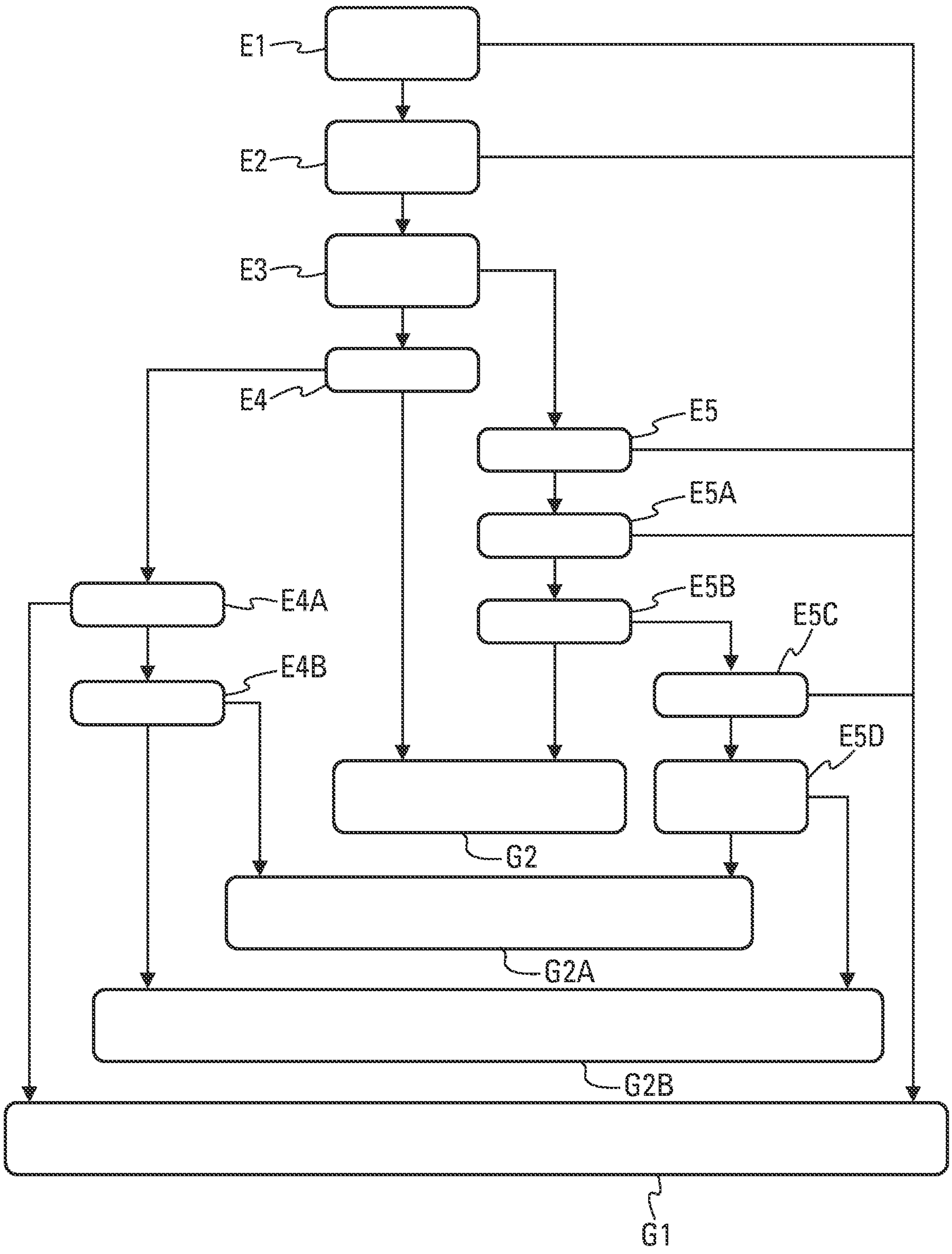
FIG. 4 is the synoptical diagram of a comparison of two lateral segments.

The comparison between a lateral segment SL1 of the lateral trajectory TL1 of the flight trajectory T1 and a lateral segment SL2 of the lateral trajectory TL2 of the flight trajectory T2, carried out by the comparison element 5, has the following successive steps, as represented in FIG. 4:

step E1) to verify if the departure points B1 and B2 of the lateral segments SL1 and SL2 are identical; and, if they are not identical, draw the conclusion that the lateral segments SL1 and SL2 are different (step G1); and otherwise, carry out a step E2);

step E2) to verify if the types Ti1 and Ti2 of the lateral segments SL1 and SL2 are identical, and, if they are not identical, draw the conclusion that the lateral segments SL1 and SL2 are different (G1); and otherwise, carry out a step E3);

step E3) to verify if the two lateral segments SL1 and SL2 of identical types are of rectilinear type or curved type, and if the two lateral segments SL1 and SL2 are of rectilinear type, carry out a step E4), and if the two lateral segments SL1 and SL2 are of curved type, carry out a step E5);

step E4) to verify if the arrival points E1 and E2 of the rectilinear lateral segments SL1 and SL2 are identical, and, if they are identical, draw the conclusion that the lateral segments SL1 and SL2 are identical (G2); and otherwise, carry out a step E4A);

step E4A) to verify if the orientations $\alpha 1$ and $\alpha 2$ of the lateral segments SL1 and SL2 are identical, and, if they are not identical, draw the conclusion that the lateral segments SL1 and SL2 are different (step G1); and otherwise, carry out a step E4B);

step E4B) to verify which of the two segments SL1 and SL2 is the shortest and consider the shortest segment as corresponding to the start of the other segment, namely:

step G2A: segment SL2 is shorter than segment SL1;

step G2B: segment SL1 is shorter than segment SL2;

step E5) to verify if the directions of rotation Td1 and Td2 of the curved lateral segments SL1 and SL2 are identical, and, if they are not identical, draw the conclusion that the lateral segments SL1 and SL2 are different (G1); and otherwise, carry out a step E5A);

step E5A) to verify if the centers C1 and C2 of the lateral segments SL1 and SL2 are identical, and, if they are not identical, draw the conclusion that the lateral segments SL1 and SL2 are different (G1); and otherwise, carry out a step E5B);

step E5B) to verify if the arrival points E1 and E2 of the lateral segments SL1 and SL2 are identical, and, if they are identical, draw the conclusion that the lateral segments SL1 and SL2 are identical (G2); and otherwise, carry out a step E5C);

step E5C) to verify if the turn radii C1E1 and C2E2 of the lateral segments SL1 and SL2 are identical, and, if they are not identical, draw the conclusion that the lateral segments SL1 and SL2 are different (G1); and otherwise, carry out a step E5D);

step E5D) to verify which of the two segments SL1 and SL2 is the shortest and consider the shortest segment as corresponding to the start of the other segment, namely:

step G2A: segment SL2 is shorter than segment SL1;

step G2B: segment SL1 is shorter than segment SL2.

Figure 5:
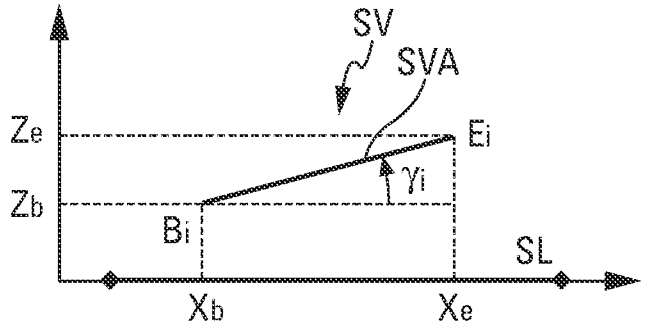
FIGS. 5 and 6 present geometrical parameters for defining a vertical segment of a vertical trajectory.
Figure 6:
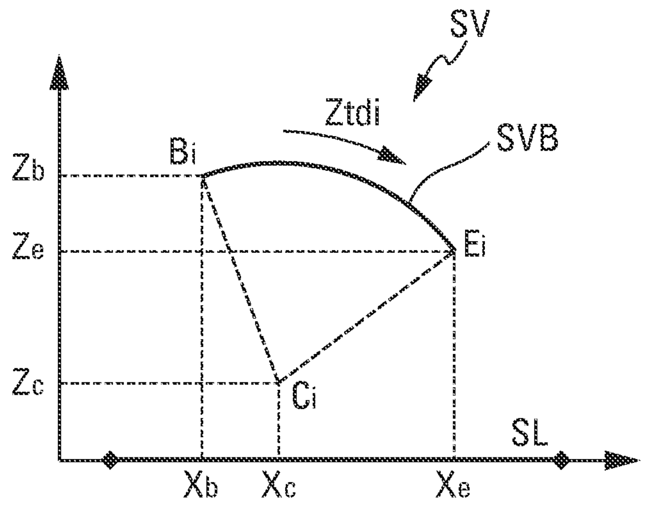

Furthermore, a vertical segment (of trajectory) SV can be a vertical segment SVA of rectilinear type (namely, a line segment) or a vertical segment SVB of curved or curvilinear type (namely, a circular arc), as shown respectively in FIGS. 5 and 6. This vertical segment SVA, SVB is defined by the following geometric parameters:

a. the reference to a lateral segment SL;

b. the abscissa Xb of the departure point Bi (of the vertical segment SVA, SVB) on the lateral segment SL;

c. the altitude Zb of the departure point Bi of the vertical segment SVA, SVB;

d. the abscissa Xe of the arrival point Ei (of the vertical segment SVA, SVB) on the lateral segment SL;

e. the altitude Ze of the arrival point Ei of the vertical segment SVA, SVB;

f. the type Ti of segment: curved or rectilinear;

g. the abscissa Xc of the turn center Ci on the lateral segment SL (for a curved segment);

h. the altitude Zc of the turn center Ci (for a curved segment); and i. the direction of rotation Ztdi (for a curved segment).

One will also consider, for rectilinear segments, the slope $\gamma i$ of the line passing through the departure point Bi (defined by its latitude/longitude/altitude) and the arrival point Ei (defined by its latitude/longitude/altitude).

Figure 7:
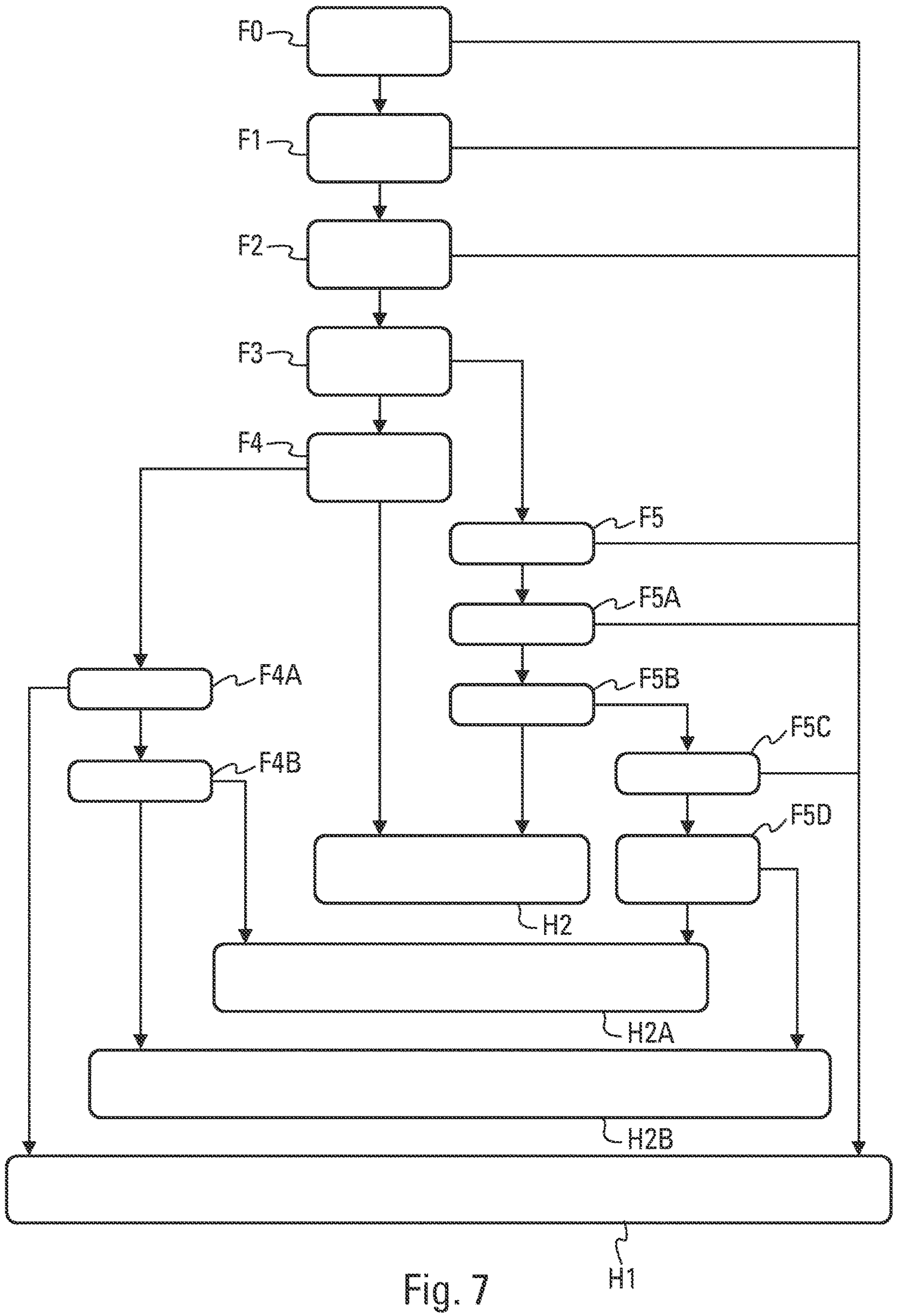
FIG. 7 is the synoptical diagram of a comparison of two vertical segments.

The comparison between a vertical segment SV1 of the vertical trajectory TV1 (of the flight trajectory T1) and a vertical segment SV2 of the vertical trajectory TV2 (of the flight trajectory T2), carried out by the comparison element 6, has the following successive steps, as represented in FIG. 7:

a preliminary step F0 as regards the comparison of the corresponding lateral segments, and, if the corresponding lateral segments are different, to draw the conclusion that the vertical segments SV1 and SV2 are likewise different (step H1); otherwise, carry out a step F1);

step F1) to verify if the departure points B1 and B2 of the vertical segments SV1 and SV2 are identical, and, if they are not identical, draw the conclusion that the vertical segments SV1 and SV2 are different (H1); and otherwise, carry out a step F2);

step F2) to verify if the types T1 and T2 of the vertical segments SV1 and SV2 are identical, and, if they are not identical, draw the conclusion that the vertical segments SV1 and SV2 are different (H1); and otherwise, carry out a step F3);

step F3) to verify if the vertical segments SV1 and SV2 of identical types are of rectilinear type or curved type, and if the two vertical segments SV1 and SV2 are of rectilinear type, carry out a step F4), and if the two vertical segments are of curved type, carry out a step F5);

step F4) to verify if the arrival points E1 and E2 of the rectilinear vertical segments SV1 and SV2 are identical, and, if they are identical, draw the conclusion that the vertical segments SV1 and SV2 are identical (step H2); and otherwise, carry out a step F4A);

step F4A) to verify if the slopes $\gamma 1$ and $\gamma 2$ of the rectilinear vertical segments SV1 and SV2 are identical and, if they are not identical, draw the conclusion that the vertical segments SV1 and SV2 are different (H1); and otherwise, carry out a step F4B);

step F4B) to verify which of the two segments SV1 and SV2 is the shortest and consider the shortest segment as corresponding to the start of the other segment, namely:

step H2A: segment SV2 is shorter than segment SV1;

step H2B: segment SV1 is shorter than segment SV2;

step F5) to verify if the directions of rotation Ztd1 and Ztd2 of the curved vertical segments SV1 and SV2 are identical and, if they are not identical, draw the conclusion that the vertical segments SV1 and SV2 are different (H1); and otherwise, carry out a step F5A);

step F5A) to verify if the centers of rotation (or turn) C11 and C2 of the vertical segments SV1 and SV2 are identical and, if they are not identical, draw the conclusion that the vertical segments SV1 and SV2 are different (H1); and otherwise, carry out a step F5B);

step F5B) to verify if the arrival points E1 and E2 of the vertical segments SV1 and SV2 are identical and, if they are identical, draw the conclusion that the vertical segments SV1 and SV2 are identical (H2); and otherwise, carry out a step F5C);

step F5C) to verify if the turn radii C1E1 and C2E2 of the vertical segments SV1 and SV2 are identical and, if they are not identical, draw the conclusion that the vertical segments SV1 and SV2 are different (H1); and otherwise, carry out a step F5D);

step F5D) to verify which of the two segments SV1 and SV2 is the shortest and consider the shortest segment as corresponding to the start of the other segment, namely:

step H2A: segment SV2 is shorter than segment SV1;

step H2B: segment SV1 is shorter than segment SV2.

The two aforementioned comparisons may be carried out successively in the lateral (or horizontal) plane and in the vertical plane.

Figure 8:
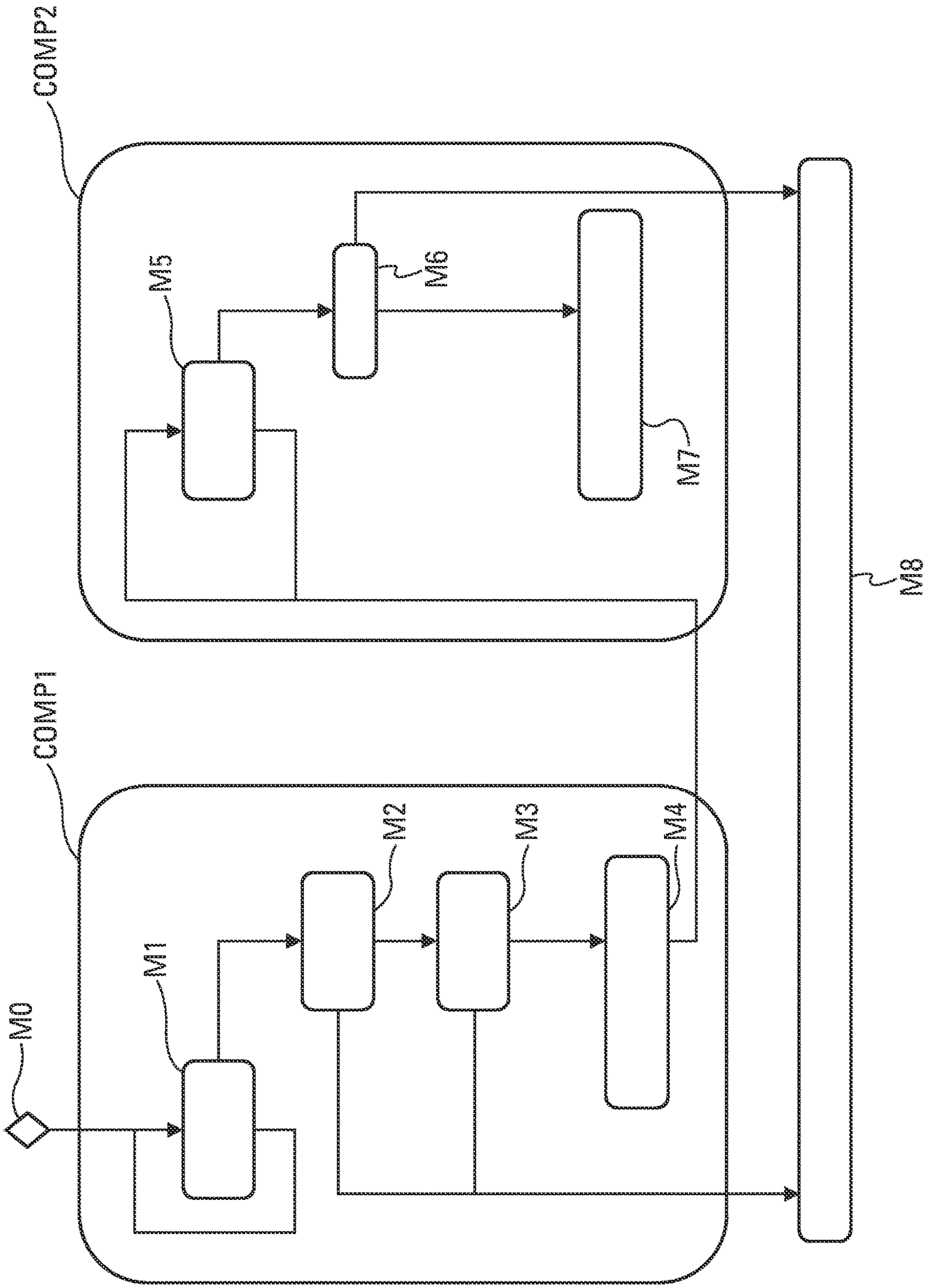
FIG. 8 is the synoptical diagram of a comparison of two flight trajectories.

The comparison between the flight trajectory T1 and the flight trajectory T2, carried out by the central processing unit 3, comprises a series of successive steps presenting two groups of consecutive comparisons, namely COMP1 (to compare the lateral trajectory TL1 and the lateral trajectory TL2) and COMP2 (to compare the vertical trajectory TV1 and the vertical trajectory TV2), as represented in FIG. 8. More precisely, this series of consecutive steps comprises:

a plurality of steps M1 (after a start M0) carried out by the comparison element 5 to verify, in succession, if the respective successive lateral segments SL1*i* and SL2*i* (i being an integer between 1 (one) and 1 (letter)) of the lateral trajectories TL1 and TL2 are identical; and for as long as they are identical (SL11 and SL21 are identical, SL12 and SL22 are identical, SL13 and SL23 are identical, etc.), repeat step M1) for the next pair SL1*i* and SL2*i*, wherein step M1 corresponds to the series of steps of FIG. 4; and otherwise, if such is not the case for a pair SL1*k* and SL2*k*, carry out a step M2);

step M2) to verify if the lateral segment SL2*k* is part of the lateral segment SL1*k*, and:

if such is not the case (step M8), draw the conclusion that the two flight trajectories T1 and T2 do not have a satisfactory common portion (less than D); and otherwise, carry out a step M3);

step M3) to verify if the sum $$\sum_{i=1}^{k} SL2k \geq D$$

of the lateral segments SL21 to SL2*k* is greater than or equal to the distance D, and:

if such is not the case (step M8), draw the conclusion that the two trajectories T1 and T2 do not have a satisfactory common portion (less than D); and otherwise, consider (step M4) that the two lateral trajectories T1L and T2L have a satisfactory common portion (greater than D), and carry out a plurality of steps M5);

the plurality of steps M5) carried out by the comparison element 6 to verify in succession whether the respective successive vertical segments SV1*j* and SV2*j* (j being an integer between 1 and m) are identical; and:

for as long as they are identical (SV11 and SV21 identical, SV12 and SV22 identical, SV13 and SV23 identical, etc.), repeat step M5) for the next pair SL1*j* and SL2*j*, step M5) corresponding to the series of steps of FIG. 7; and otherwise, if such is not the case for a pair SV1*p* and SV2*p*, carry out a step M6);

step M6) to verify if the vertical segment SV2*p* corresponds to the start of the vertical segment SV1*p* and, if such is not the case (step M8), draw the conclusion that the two flight trajectories T1 and T2 do not have a satisfactory common portion (less than D); and otherwise, consider (step M7) that the two vertical trajectories TV1 and TV2 are common for a satisfactory distance (greater than D), and thus that the two flight trajectories T1 and T2 have a satisfactory common portion.

Furthermore, in one preferred application, the comparison device 1 is part of a guidance computer 9 of a guidance system 10 which is embarked aboard the aircraft AC. In one particular embodiment, this guidance system 10 is configured to normally perform an automatic guidance of the aircraft AC during a flight at low altitude.

Figure 9:
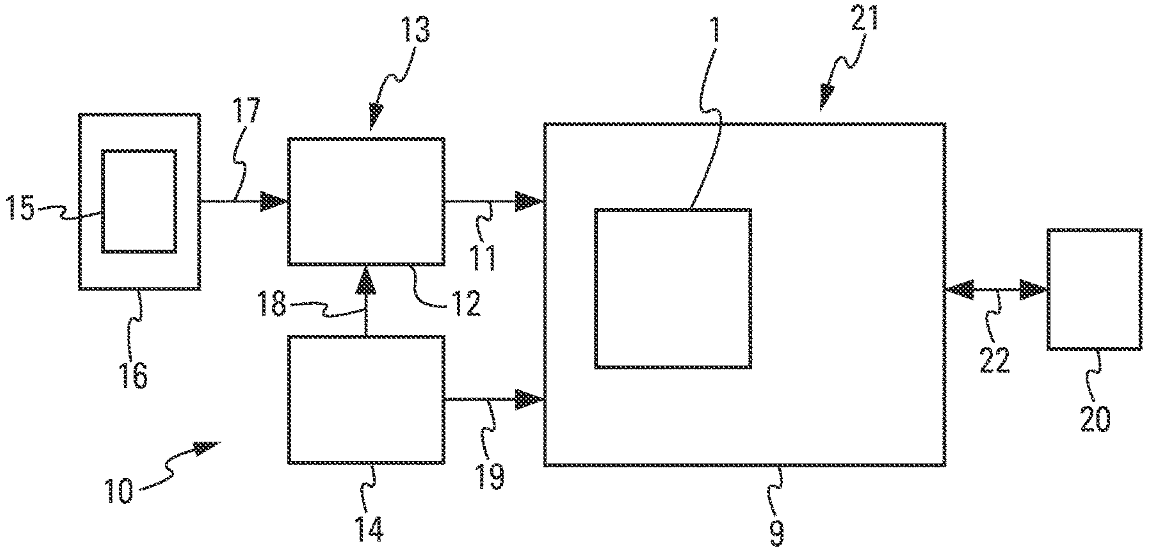
FIG. 9 illustrates schematically one particular embodiment of a guidance system of an aircraft.

The guidance system 10 has, as represented in FIG. 9, a flight management system 13 of type FMS, comprising:

a. at least one flight control computer 12. The flight control computer 12 is able to automatically calculate, during a flight of the aircraft AC along a flight trajectory T1 known as the current trajectory, a new flight trajectory T2 known as the auxiliary trajectory;

b. a guidance device 21 comprising the guidance computer 9 to guide the aircraft AC along a flight trajectory T1, T2, received from the flight management computer 12 via a link 11; and c. a trajectory change unit 20, configured to automatically carry out a change of the flight trajectory if the current and auxiliary trajectories T1 and T2 have a common leg LO of length greater than a predetermined threshold D. A change of flight trajectory consists in replacing the current trajectory T1 with the auxiliary trajectory T2 such that the guidance device 21 guides the aircraft AC along the auxiliary trajectory T2 as of the effecting of the change.

The flight trajectories T1 and T2 are flight trajectories may be low altitude trajectories that are used during a revision of a flight plan. During a revision of the flight plan, the flight management system 13 generally performs an exact copying of the segments of the current trajectory T1 up to a point of divergence with the new trajectory T2.

The guidance system 10 may also comprises a position computer 14, connected by communications links 18 and 19 respectively to the flight management system 13 and the guidance computer 21 of the aircraft AC. The position computer 14 is configured to determine automatically, in the customary manner, the current position of the aircraft AC, for example with the help of a typical global positioning system (GPS) receiver matched up with a satellite positioning system of GPS type.

During a flight, especially an automatic flight at low altitude (with an automatic pilot and/or flight director of the aircraft AC, which are part of the guidance device 21 and which are switched on), the flight trajectory T1 (FIG. 10) followed by the aircraft AC can be modified (laterally and vertically) on demand of a pilot of the aircraft AC.

To do so, the pilot modifies the flight plan with the help of an appropriate data entry unit 15 able to enter data pertaining to the new flight plan desired. This data is furnished via a link 17 to the flight control computer 12. This data entry unit 15 is part of a group 16 of information sources for providing information automatically or through intervention of a pilot to the flight control computer 12.

The flight control computer 12 calculates, in customary manner, the trajectory T2 (lateral and/or vertical) corresponding to the modified flight plan, starting from the position of the aircraft AC at the moment when the pilot requests this calculation. This position is received from the position computer 14 through the link 18.

Figure 10:
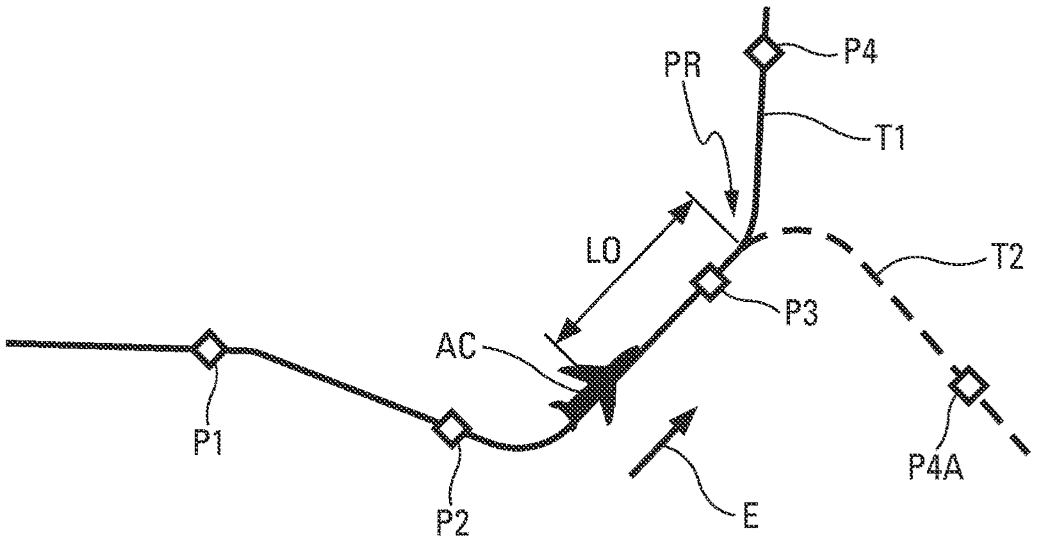
FIG. 10 shows a flight of an aircraft guided with the help of a guidance system according to the invention, during a change of trajectory.

The calculation of the new flight trajectory T2 may take several seconds (calculation time of the systems). During this time, the aircraft AC continues to fly along the current flight trajectory T1, as shown in FIG. 10. In this FIG. 10, the direction of flight of the aircraft AC is shown by an arrow E.

In the example of FIG. 10, the current trajectory T1 passes through successive "waypoints" P1, P2, P3 and P4, being part of the initial flight plan. Moreover, in this example, the new flight trajectory (or auxiliary trajectory) T2 deviates from the flight trajectory T1 at a point of divergence PR and arrives at a waypoint P4A (for example, one entered by the pilot using the data entry unit 15), instead of the waypoint P4.

To secure the transition between the current trajectory T1 and the auxiliary trajectory T2, these trajectories T1 and T2 should have a common portion, known as a common leg L0. Thus, before authorizing the guidance along the new trajectory T2, the device 1 (as described above) compares the two trajectories T1 and T2 to verify if these two trajectories T1 and T2 do indeed have such a common leg L0 (which corresponds at least to the flight time of the aircraft AC during the calculation of the new trajectory T2).

For example, if the two trajectories T1 and T2 do not have a common portion or leg, or if the common leg L0 is too short, the new trajectory T2 cannot be enabled and the aircraft AC will continue to be guided by the guidance system 10 along the current trajectory T1; and on the other hand, if the two trajectories T1 and T2 have a common leg L0 of sufficient length (greater than the distance D), the new trajectory T2 can be enabled and the aircraft AC will be guided by the guidance system 10 along this new trajectory T2.

A change of flight trajectory consists in replacing the current trajectory T1 with the auxiliary trajectory T2 to make the aircraft AC fly along the auxiliary trajectory T2 as of the effecting of the change. To do so, the trajectory change unit 20 which can be part of the guidance computer 9 or another element of the guidance device 21 (and which receives the information via a link 22) performs the necessary switching operations to go from T1 to T2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s).

In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for automatic comparison of a first flight trajectory and a second flight trajectory for an aircraft, wherein the first flight trajectory includes a first vertical trajectory and a first lateral trajectory, and the second flight trajectory includes a second vertical trajectory and a second lateral trajectory, wherein the first lateral trajectory and the second lateral trajectory each include a succession of lateral segments, with each lateral segment being defined by corresponding geometric parameters which describe a shape of the lateral segment and identify respective lateral departure and arrival points for the lateral segment, and the first vertical trajectory and the second vertical trajectory each include a succession of vertical segments, with each vertical segment being defined by corresponding geometric parameters which describe a shape of the vertical segment and identify respective vertical departure and arrival points for the vertical segment, the method comprising:

a) receiving the first flight trajectory and the second flight trajectory;

b) automatically carrying out at least one of the following comparison steps b1 and b2:

b1) comparing the first lateral trajectory and the second lateral trajectory of the first and second flight trajectories, wherein the comparison is performed by comparing the corresponding geometric parameters describing the shapes and the respective departure and arrival points of successive lateral segments of the first and second lateral flight trajectories, rather than comparing individual points along the first and second lateral trajectories, and wherein the comparison is continued for as long as the respective successive lateral segments of the first and second lateral flight trajectories are identical over a predetermined distance in a horizontal plane; and b2) comparing the first vertical trajectory and the second vertical trajectory of the first and second flight trajectories, wherein the comparison is performed by comparing the corresponding geometric parameters describing the shapes and respective departure and arrival points of successive vertical segments of the first and second vertical flight trajectories, rather than comparing individual points along the first and second vertical trajectories, and wherein the comparison is continued for as long as the respective successive vertical segments of the first and second vertical flight trajectories are identical over the predetermined distance in the horizontal plane; and c) transmitting automatically the result of the comparison carried out in step b1) or b2) to a guidance device comprising an automatic pilot and/or flight director of the aircraft, a display that presents graphical information to a crew in the aircraft cockpit and a trajectory change unit that changes the first flight trajectory of the aircraft to the second flight directory where the comparison carried out in step b1) or b2) indicates that the first and second flight trajectories are the same for the predetermined distance.

2. The method of claim 1, wherein in step b1 the comparison includes comparing a first lateral segment of the first lateral trajectory and a second lateral segment of the second lateral trajectory, wherein the first lateral segment and the second lateral segment are both one of a rectilinear shape or a curved shape, and have the respective departure point and arrival points, and the comparison includes:

E1) verifying that the respective departure points of the first and second lateral segments are identical and, if they are not identical, concluding that the first and second lateral segments are different and, if they are identical, carrying out step E2;

E2) verifying if the first and second lateral segments are of the same shape and, if they are not of the same shape, concluding that the first and second lateral segments are different and, if they are of the same shape, carrying out step E3;

E3) determining if the first and second lateral segments are of a rectilinear shape or a curved shape, and if the first and second lateral segments are of the rectilinear shape carrying out a step E4), and if first and second later lateral segments are of the curved shape carrying out a step E5);

E4) verifying if the respective arrival points of the first and second lateral segments are identical and, if they are identical, finding that the first and second lateral segments are identical; and otherwise, carrying out a step E4A);

E4A) verifying if the orientations of the first and second lateral segments are identical and, if they are not identical, concluding that the first and second lateral segments are different; and otherwise, carrying out a step E4B);

E4B) determining a shorter one of the first and second lateral segments and treating the shorter of the first and second lateral segments as corresponding to the start of the longer segment;

E5) verifying if directions of rotation of the first and second lateral segments are identical and, if they are not identical, determining that the first and second lateral segments are different; and otherwise, carrying out a step E5A);

E5A) verifying if centers of the first and second lateral segments are identical and, if they are not identical, concluding that the first and second lateral segments are different; and otherwise, carrying out a step E5B);

E5B) verifying if the respective arrival points of the first and second lateral segments are identical and, if they are identical, concluding that the first and second lateral segments are identical; and otherwise, carrying out a step E5C);

E5C) verifying if a turn radii of the first and second lateral segments are identical and, if they are not identical, concluding that the first and second lateral segments are different; and otherwise, carrying out a step E5D); and E5D) determining which of the first and second lateral segments is the shorter of the first and second lateral segments and using the shorter lateral segment as corresponding to the start of the longer segment.

3. The method of claim 1 wherein in step b2 the comparison includes a comparison between a first vertical segment of the first flight trajectory and a second vertical segment of the second flight trajectory, each of the first and second vertical segments being either a vertical segment of rectilinear shape or a vertical segment of curved shape and each of the first and second vertical segments including the respective departure and arrival points, wherein the comparison between the first and second vertical segments includes:

F0) verifying if the first and second vertical segments correspond to a same lateral segment and, if they do not correspond to the same lateral segment, drawing the conclusion that the first and second vertical segments are different; and otherwise, carrying out a step F1);

F1) verifying if the departure points of the first and second vertical segments are identical and, if they are not identical, drawing the conclusion that the first and second vertical segments are different; and otherwise, carrying out a step F2)

F2) verifying if the shapes of the first and second vertical segments are identical and, if they are not identical, drawing the conclusion that the first and second vertical segments are different; and otherwise, carrying out a step F3);

F3) verifying if the two vertical segments of identical shape are of rectilinear shape or curved shape, and if the two vertical segments are of rectilinear shape carrying out a step F4), and if the two vertical segments are of curved shape carrying out a step F5);

F4) verifying if the arrival points of the first and second vertical segments are identical and, if they are identical, drawing the conclusion that the first and second vertical segments are identical; and otherwise, carrying out a step F4A);

F4A) verifying if the slopes of the first and second vertical segments are identical and, if they are not identical, drawing the conclusion that the first and second vertical segments are different; and otherwise, carrying out a step F4B);

F4B) verifying which of the two vertical segments is the shortest and using the shortest vertical segment as corresponding to the start of the other vertical segment;

F5) verifying if the directions of rotation of the first and second vertical segments are identical and, if they are not identical, drawing the conclusion that the first and second vertical segments are different; and otherwise, carrying out a step F5A);

F5A) verifying if the centers of rotation of the first and second vertical segments are identical and, if they are not identical, drawing the conclusion that the first and second vertical segments are different; and otherwise, carrying out a step F5B);

F5B) verifying if the arrival points of the first and second vertical segments are identical and, if they are identical, concluding that the first and second vertical segments are identical; and otherwise, carrying out a step F5C);

F5C) verifying if a turn radii of the first and second vertical segments are identical and, if they are not identical, concluding that the first and second vertical segments are different; and otherwise, carrying out a step F5D);

F5D) identifying a shortest one of the first and second vertical segments and using the shortest one of the first and second vertical segments as corresponding to a start of the othersegment.

4. The method as claimed in claim 1, wherein step b) includes successively carrying out the comparison steps b1 and b2.

5. The method as claimed in claim 1, further comprising copying the first flight trajectory and using the copied first flight trajectory to form the second flight trajectory.

6. The method as claimed in claim 1, wherein the first and second flight trajectories are low-altitude flight trajectories.

7. A device for automatic comparison of a first and a second flight trajectories for an aircraft, the first flight trajectory comprising a first vertical trajectory and a first lateral trajectory, and the second flight trajectory comprising a second vertical trajectory and a second lateral trajectory, the first lateral trajectory and the second lateral trajectory comprising a succession of a plurality of lateral segments, with each lateral segment being defined by corresponding geometric parameters which characterize a shape of the lateral segment and identify respective lateral departure and arrival points, and the first vertical trajectory and the second vertical trajectory comprising a succession of a plurality of vertical segments, with each vertical segment being defined by corresponding geometric parameters which characterize a shape of the vertical segment and identify respective lateral departure and arrival points, the device comprising a processing unit configured to execute instructions stored on a non-transitory memory, wherein execution of the instructions by the processing unit causes the device to:

receive the first flight trajectory and the second flight trajectory;

compare the first lateral trajectory and the second lateral trajectory of the first flight trajectory and the second flight trajectory, wherein the comparison is performed by comparing the geometric parameters defining the shapes and the respective departure and arrival points of successive lateral flight segments of the first and second lateral flight trajectories, rather than comparing individual points along the first and second lateral trajectories, and the comparison being performed while the successive lateral flight segments are identical over at least a predetermined distance in a horizontal plane; and compare the first vertical trajectory and the second vertical trajectory of the first and second flight trajectories, wherein the comparison is performed by comparing the corresponding geometric parameters defining the shapes and the respective departure and arrival points of successive vertical flight segments of the first and second vertical flight trajectories, rather than comparing individual points along the first and second vertical trajectories, the comparison being performed while the successive vertical segments are identical over at least the predetermined distance; and automatically transmit results of the comparisons to a guidance device comprising an automatic pilot and/or flight director of the aircraft, a display that presents graphical information to a crew in the aircraft cockpit and a trajectory change unit that changes the first flight trajectory of the aircraft to the second flight directory when both comparisons indicate that the first and second flight trajectories are the same for the predetermined distance.

8. A guidance system for an aircraft comprising:

a flight control calculator configured to automatically calculate, during a flight of the aircraft along a current flight trajectory and an auxiliary flight trajectory;

a guidance device configured to guide the aircraft along a flight trajectory;

the comparison device of claim 7, configured to compare the current trajectory and the auxiliary trajectory; and the trajectory change unit configured to automatically make a change in the flight trajectory if the current and auxiliary trajectories have a common leg of length greater than a predetermined threshold, the change in the flight trajectory consisting of replacing the current trajectory with the auxiliary trajectory so that the guidance device guides the aircraft along the auxiliary trajectory as of the change being effected.

9. An aircraft comprising the device recited in claim 7.

10. An aircraft comprising the guidance system recited in claim 8.

11. A method for comparing a first flight trajectory with a second flight trajectory for an aircraft, the method comprising:

causing a guidance device comprising a trajectory change unit to have the first flight trajectory govern a flight path of the aircraft;

designating the second flight trajectory as a desired flight path of the aircraft;

forming a first segment of the first flight trajectory, wherein the first segment includes a starting point and the first segment is defined by geometric parameters characterizing a shape of the first segment and, besides the first segment starting point, a first segment arrival point;

forming a second segment of the second flight trajectory, wherein the second segment includes the starting point of the first segment and the second segment is defined by geometric parameters characterizing a shape of the second segment and, besides the second segment starting point, a second segment arrival point;

comparing the shape and the starting and arrival points of the first segment to the shape and the starting and arrival points of the second segment, rather than comparing individual points along the first segment to individual points along the second segment;

based on the comparison, determining that the first segment and the second segment are or are not identical;

if the determination is that the first and second segments are not identical, causing the first flight trajectory to continue governing the flight path and reporting that the second flight trajectory is not suited to govern the flight path;

if the determination is that the first and second segments are identical, segmenting the first flight trajectory to form another first segment which is in succession to the first segment and segmenting the second flight trajectory to form another second segment which is in succession to the second segment;

repeating the forming, comparing and determining steps until a determination is made that one of the successive first and second segments are not identical or until at least one the first and second segments extend a predetermined distance, and in response to a succession of determinations that the first and second segments are identical, causing a guidance device comprising an automatic pilot and/or flight director of the aircraft, a display that presents graphical information to a crew in the aircraft cockpit and a trajectory change unit that changes the first flight trajectory of the aircraft to the second flight trajectory to thereby govern the flight path of the aircraft and reporting to the cockpit display the change in the flight trajectory governing the flight path of the aircraft.

12. The method of claim 11 wherein the first flight trajectory includes a first vertical trajectory and the second flight trajectory includes a second vertical trajectory, and the first segment is a first vertical segment and the second segment is a second vertical segment, wherein in the comparison step the first vertical segment is compared to the second vertical segment and in the determining step the determination is whether the first vertical segment is identical to the second vertical segment.

13. The method of claim 11 wherein the first flight trajectory includes a first vertical trajectory and the second flight trajectory includes a second vertical trajectory, and the first segment is a first vertical segment and the second segment is a second vertical segment, wherein in the comparison step a geometric parameter of the first vertical segment is compared to a corresponding geometric parameter of the second vertical segment and in the determining step the determination is whether the first vertical segment is identical to the second vertical segment.

14. The method of claim 11 wherein the first flight trajectory includes a first lateral trajectory and the second flight trajectory includes a second lateral trajectory, and the first segment is a first lateral segment and the second segment is a second lateral segment, wherein in the comparison step a geometric parameter of the first lateral segment is compared to a corresponding geometric parameter of the second lateral segment and in the determining step the determination is whether the first lateral segment is identical to the second lateral segment.

15. The method of claim 11 further comprising at least one of: comparing a turn radius of the first segment to a turn radius of the second segment; comparing a direction of rotation of the first segment to a direction of rotation of the second segment, and comparing an orientation of the first segment to an orientation of the second segment.

16. The method of claim 11 wherein the repeating step includes setting a starting point for each of successive first and second segments as corresponding to an ending point of a shorter one of immediately prior first and second segments.

* * * * *